INVENTORS
WALTER F. GREEN
ROBERT L. WILLIAMS
WYN E. McCOY

INVENTORS
WALTER F. GREEN
ROBERT L. WILLIAMS
WYN E. McCOY
BY Gravely Lieder & Woodruff
ATTORNEYS

United States Patent Office
3,420,589
Patented Jan. 7, 1969

3,420,589
UNITIZED TAPERED ROLLER BEARING
Walter F. Green, Canton, Robert L. Williams, North Canton, and Wyn E. McCoy, Canton, Ohio, assignors to Timken Roller Bearing Company, Canton, Ohio, a corporation of Ohio
Filed Aug. 31, 1966, Ser. No. 576,329
U.S. Cl. 308—174                    3 Claims
Int. Cl. B16c 19/14; B16c 19/34

ABSTRACT OF THE DISCLOSURE

A single row unitized tapered roller bearing for absorbing thrust in both axial directions in which the cone is provided with an integral thrust rib abutted by the small diameter ends of the rollers, a separately formed thrust rib is attached to the cup in position to abut the large diameter ends of the rollers, and attachment means connects the separate thrust rib to the cup to retain the rollers in preadjusted operating abutment with both thrust ribs.

---

This invention relates to roller bearings and particularly to tapered roller bearings which are constructed to be unitized and rendered capable of withstanding thrust in both directions.

There has been a definite need for a tapered roller bearing of unitized character that can withstand thrust in both directions, and which possesses simplicity of construction so that the components of the bearing assembly can be unitized without loss of capacity in radial loading.

Heretofore, unitized tapered roller bearings having an integral thrust rib on the cone and on the cup have had to sacrifice a normally full complement of rollers in order to permit assembly of the cage and rollers on the cone. Such prior constructions have been complicated, have necessitated a comparatively large number of components and have been limited in the range of sizes and load capacities.

It is, therefore, an object of this invention to provide a unitized tapered roller bearing that will overcome the foregoing problems and adverse conditions of manufacture as well as characteristics that have hampered full use of the advantages of such a unitized bearing.

It is also an object of this invention to provide a compact high load capacity tapered roller bearing that embodies a single row of rollers and is able to withstand thrust in both directions.

Another object of this invention is to provide a tapered roller bearing with a separately formed thrust rib and cup to simplify manufacturing and assembly thereof, and thereafter to connect the rib and cup to form a unit so that a fully assembled bearing can be provided.

A further object of this invention is to provide a unitized tapered roller bearing where the tolerances of the parts of the bearing unit can be controlled to avoid the use of shims or other means for adjustment when mounting the bearing in operative position.

The invention also consists of an assembly of a cone with an integral thrust rib, rollers and cage, and a separate cup thrust rib and cup, all of which can be easily assembled to result in a unitized bearing of simple, compact and economical design.

Other and further objects and advantages of this invention will be hereinafter more particularly set forth in connection with certain preferred embodiments thereof which are disclosed in the accompanying drawings, wherein.

Figure 1:
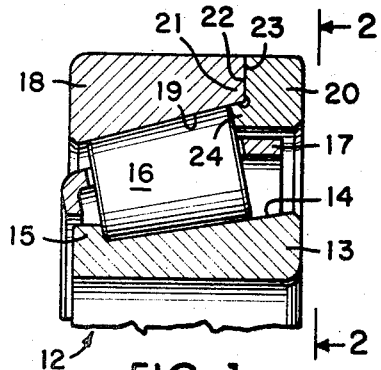
FIG. 1 is a fragmentary sectional view of a tapered roller bearing whose parts and components have been assembled in such a way as to result in a unitized bearing.
Figure 2:
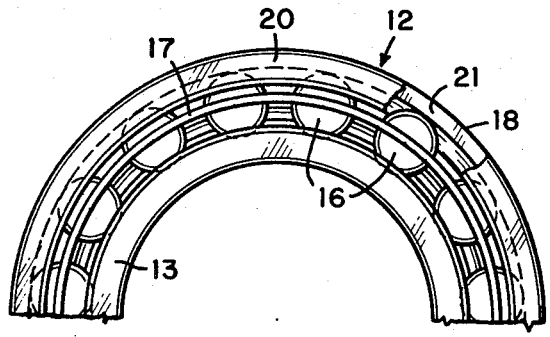
FIG. 2 is a fragmentary end view taken at line 2—2 in FIG. 1.

Referring now to FIGS. 1 and 2 there is shown in fragmentary sectional elevation and in end view a tapered roller bearing 12 in which the cone 13 is formed with a tapered race 14 having an integral thrust rib 15 at the small diameter end of the race 14. A full complement of tapered rollers 16 are assembled on the cone race 14, and a retainer cage 17 of conventional form is applied to space the rollers 16 in proper position. A cup member 18 having a tapered race 19 is provided for the bearing.

As before noted, in many prior bearing assemblies the cup existed as a separate part and was assembled in operating position independently of the cone and roller subassembly. In those instances where the cup was assembled with the cone and rollers a complicated and expensive structure had to be utilized. Efforts to reduce the expense of making such latter type bearings required reducing the number of rollers which limited the load carrying capacity.

The present improved bearing overcomes the foregoing difficulties by providing the cup 18 with a separate thrust rib 20, and by joining the cup and rib in such a way that a permanent or rigid connetcion is effected. In this way the bearing can be manufactured without sacrificing load capacity and it can be easily assembled to result in an economical and efficient unitized bearing. There are several alternate ways of uniting the cup 18 and rib 20 which will be set forth.

In FIG. 1 the rib 20 is permanently united with the cup 18 adjacent large diameter end 21 of the cup race 19 by either electron beam welding or by laser beam welding which results in fusing the abutting faces 22 and 23 of the cup 18 and rib 20. The rib 20 is formed with an axially directed lip or rim 24 which extends into the end 21 of the race 19 to provide a shield at the inner ends of the faces 22 and 23, whereby any flash of material will be prevented from entering the race to create a fin or rough surface which would be detrimental to the bearing. Furthermore, the lip 24 will guard the rollers 16 against heat damage, although the suggested welding methods are extremely rapid and do not normally allow the heat to penetrate to the surrounding areas beyond the zone where the fusion is desired.

In place of welding the rib 20 to the cup 18, the rib and cup may be permanently united by suitable cementitious or adhesive material. For example, there are epoxy or furan resins that have great adhesive characteristics for metallic members. When using the above adhesives the rib 20 will be of the type shown in FIG. 1 so that there will be no chance for the adhesive to contact the rollers 16 or reach the race 19.

Figure 3:
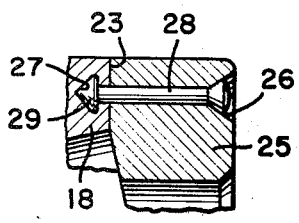
FIG. 3 is a fragmentary sectional view of a modified bearing cup and thrust rib.
Figure 4:
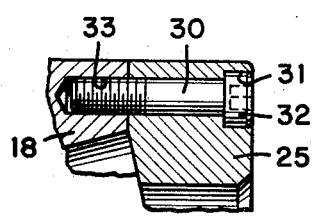
FIG. 4 is a fragmentary sectional view of a further modified bearing cup and thrust rib.

Alternatively to the permanent adhering of the rib and cup, as in FIG. 1, a modified rib 25 may be used, as shown in FIG. 3, in which there are a plurality of circumferentially spaced apertures 26 directed to match with undercut recesses 27 in the end face 22 of the cup 18. The rib 25 does not require a lip, such as the lip 24 of FIG. 1, since rivets 28 are utilized. When driven into position the inner end 29 of each rivet 28 is upset in the recess 27 to securely attach the ribs 25 and withstand the thrust from the rollers 16. In place of rivets 28, cap screws 30 may be used, as shown in FIG. 4, in which case the rib 25 is suitably counterbored at 31 to receive the head 32 of the screw and the cup is suitably tapped at 33 to receive the screws 30.

Figure 5:
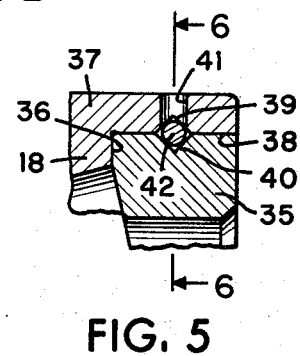
FIG. 5 is a fragmentary sectional view of a unitized bearing cup and thrust rib in which certain parts have modified from that shown in FIG. 1.
Figure 7:
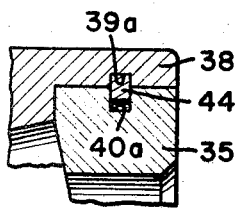
FIG. 7 is still another fragmentary sectional view of a modified cup and thrust rib for a unitized tapered roller bearing.
Figure 6:
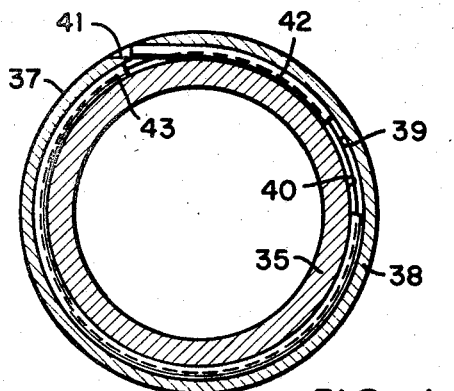
FIG. 6 is a sectional view taken at line 6—6 in FIG. 5.

The rib and cup may also be united as by the structure seen in FIGS. 5, 6 and 7. In FIGS. 5 and 6 the rib 35 is sized to be received in a recess 36 formed in the cup 37 by counterboring a portion 38 of the cup. The cup portion 38 and the rib 35 are formed with matching grooves 39 and 40 respectively. The grooves extend about the parts and groove 39 has a tangential bore 41 opening thereto. After the rib 35 is positioned in the recess 36 a lock wire 42 is pushed into the tangential bore 41 and engages in grooves 39 and 40 as it extends circumferentially and eventually has its inner end 43 in abutment with the wire in the tangential bore 41 (see FIG. 6). The same assembly can be achieved by using a plastic material like Delrin in place of the metallic wire 42. An alternative is to use a circular snap lock ring 44 as shown in FIG. 7. In this latter case the rib 35 and the cup portion 38 are formed with matching channels 39a and 40a which receive the ring 44. The channel 40a is sufficiently deep to house the ring 44 until it can snap into channel 39a. It is understood that the ring 44 may be made of any suitable material.

Figure 8:
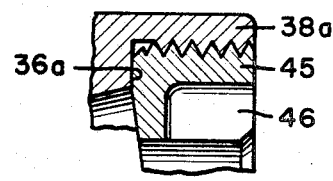
FIG. 8 is a fragmentary sectional view of a modified cup and thrust rib for a unitized bearing of the type seen in FIG. 1.
Figure 9:
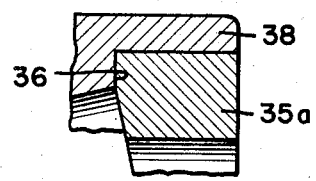
FIG. 9 is yet another fragmentary sectional view of a cup and thrust rib for a unitized bearing.

Instead of relying upon the use of a lock wire or ring, a mounting of the type seen in FIG. 8 or 9 may be used. In FIG. 8 the rib 45 is externally threaded and has diametrically spaced recesses 46 (one being shown) for the reception of a suitable tool for threading the rib into the threads of the cup portion 39a until the rib 45 is firmly seated in the cup recess 36a. In FIG. 9 the rib 35a is suitably sized so that it is received in the cup recess 36 of portion 38 with a push or press fit of sufficient resistance to take the thrust of the bearing when in operation.

Figure 10:
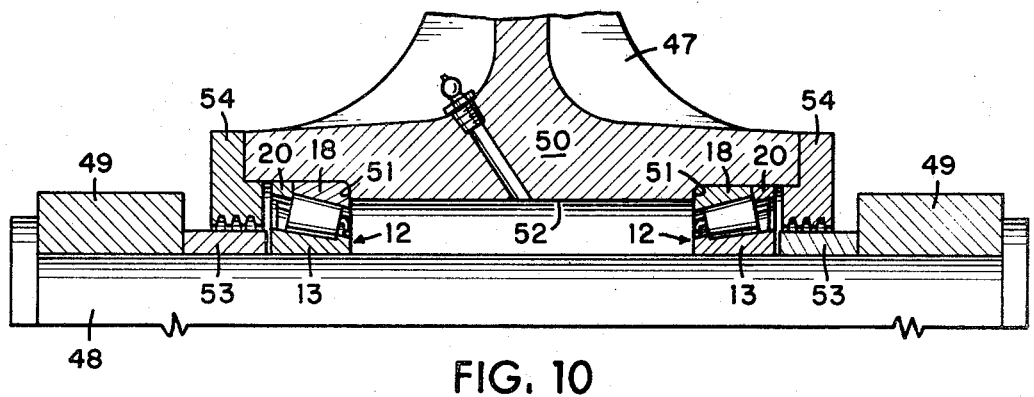
FIG. 10 is a fragmentary sectional view of one application for the unitized bearing of this invention.
Figure 11:
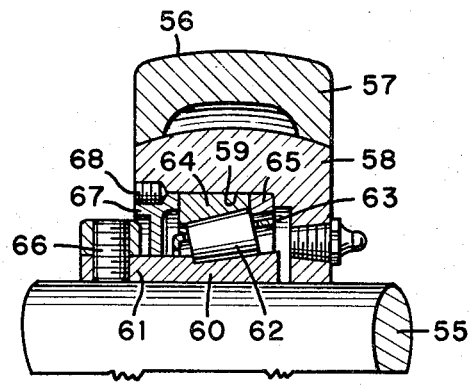
FIG. 11 is a fragmentary sectional view of another application for the bearing of this invention.

The utility of a bearing of the foregoing character, in any of its disclosed forms, is shown in FIGS. 10 and 11. In these views the unitized bearing conforms to the bonded or adhesively united cup and rib type seen in FIG. 1. The view is of a mine head sheave 47 revolvably mounted on a stationary shaft 48. The shaft 48 is supported in arms 49 and does not turn. The sheave 47 has a central hub 50 with bearing seats 51 at each end of the bore 52. A unitized bearing 12 is mounted with its cup 18 and rib 20 in each of the bearing seats 51 and its cone 13 on the shaft 48. A spacer 53 is disposed on the shaft 48 adjacent each of the arms 49 to maintain the sheave in centered position, and end caps 54 are secured to each end of the hub 50 to enclose the bearings 12. With bearings 12 used in place of conventional bearings there is no need to use shims to adjust the bearing mounting. The bearings 12 are firmly seated in the hub seats 51 and axial clearance is provided at the spacers 53, whereby relative axial movement between the hub 50 and shaft 48 can be permitted in the tolerance factor of each bearing. Thus, manual adjustment is avoided, the bearings 12 can be mounted in the hub to allow for a more complete bench assembly, the bearing cones do not have to be clamped axially so that less exacting tolerances are required for cone width, there is no need to clamp the bearing cup as the bearing has the ability to take thrust in either direction, and an important feature is that the bearings allow for thermally induced changes in the parts of the assembly.

In FIG. 11 a rotating shaft 55 is mounted in a pillow block 56 consisting of the fixed member 57 and the swivel member 58 which has a seat 59 for the bearing. In this disclosure the bearing includes a cone 60 with an axial extension 61, rollers 62 and roller cage 63, cup 64 and adhesively mounted thrust rib 65. The cone extension 61 is held in position on the shaft 55 by a set screw 66 so that the cone rotates. The recess 59 is closed by a closure disc 67 which is secured in position by set screw 68. Since the cone 60 is fixed to and moves with the shaft 55 and the cup α3 is capable of being located on the seat 59 as desired, the pillow block mounting can provide flexibility in the bearing adjustment.

Figure 12:
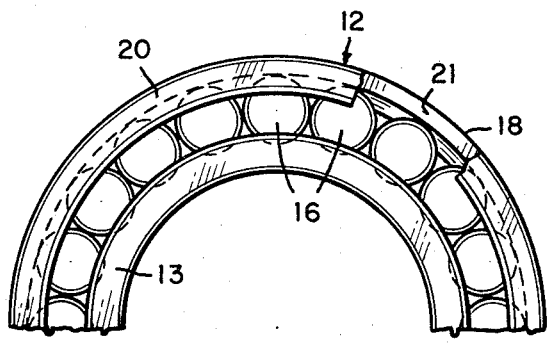
FIG. 12 is a fragmentary end view, similar to FIG. 2, showing a bearing with a full complement of rollers in which no cage is used.

In its broadest aspects this invention contemplates the making of a unitized tapered roller bearing in which no roller cage is included so that a full complement of rollers can be used. In this event the unitizing of the bearing is accomplished when the cup rib is attached. Such a bearing is shown in FIG. 12 where like parts are indicated with like numerals, as in FIG. 2.

The foregoing bearings have the important advantages of being unitized so that the applications therefor are greatly increased. While certain preferred examples of the bearing have been disclosed it is understood that the scope of the invention is to be circumscribed only by the claims appended hereto.

What is claimed is:

1. A unitized single row tapered roller bearing including: a cone formed with an outer conical race and an integral thrust rib disposed at the small diameter end of said race; a single row of tapered rollers engaged on said outer race; a cage retaining said tapered rollers in spaced relation on said outer race; a cup formed with an inner conical race engaged on said tapered rollers; a separately formed thrust rib having a radially directed face and an annular axially directed lip, said lip being fitted into said cup adjacent the large diameter end of said conical race; and said radially directed face abutting said cup; and means connecting said separate thrust rib and cup in assembly with said lip abutting said rollers and retaining said rollers in running abutment with said integral thrust rib.

2. The unitized bearing of claim 1 wherein said connecting means comprises material of said abutting face of said separate thrust rib and cup outwardly of said lip fused together.

3. The unitized bearing of claim 1 wherein said connecting means comprises adhesive material between said separate thrust rib and cup and said axially directed lip excludes said adhesive material from said outer race engaged on said rollers.

References Cited

UNITED STATES PATENTS

| 1,194,918 | 8/1916 | Wright | 308—214 |
| 1,375,022 | 4/1921 | Sellew | 308—196 |
| 1,976,613 | 10/1934 | Herrmann | 308—214 |
| 2,040,741 | 5/1936 | Hoke | 308—214 |
| 2,130,258 | 9/1938 | Baker et al. | 308—214 |
| 3,208,804 | 9/1965 | Stenert et al. | 308—216 |

FOREIGN PATENTS

| 680,978 | 10/1950 | Great Britain. |

MARTIN P. SCHWADRON, *Primary Examiner.*

FRANK SUSKO, *Assistant Examiner.*